United States Patent [19]

Kennon

[11] Patent Number: 4,708,408

[45] Date of Patent: Nov. 24, 1987

[54] HOME ENTERTAINMENT ACCESSORY ORGANIZER

[76] Inventor: Ronnie Kennon, 833 University Blvd., Mobile, Ala. 36609

[21] Appl. No.: 906,409

[22] Filed: Sep. 12, 1986

[51] Int. Cl.$^4$ .................. A47B 81/06; A47B 49/00
[52] U.S. Cl. ........................................ 312/9; 312/11; 312/125; 206/387
[58] Field of Search ............... 312/9, 10, 11, 7.2, 312/125, 232, 233, 305; 206/387

[56] References Cited

U.S. PATENT DOCUMENTS

| | | |
|---|---|---|
| 887,631 | 5/1908 | Hawthorne ........................... 312/10 |
| 1,233,629 | 7/1917 | Wettergren et al. ................ 312/232 |
| 1,358,004 | 11/1920 | Lietz ..................................... 312/232 |
| 3,185,307 | 5/1965 | Higgins ..................................... 312/9 |
| 3,228,648 | 1/1966 | Tils ....................................... 312/233 |
| 3,341,271 | 9/1967 | Nelson ................................... 312/10 |
| 3,674,132 | 7/1972 | Loss ..................................... 206/387 |
| 4,126,366 | 11/1978 | Handler et al. ...................... 312/125 |
| 4,411,482 | 10/1983 | Hoff ...................................... 312/233 |
| 4,463,856 | 8/1984 | Strasser ................................. 312/125 |

FOREIGN PATENT DOCUMENTS

| | | | |
|---|---|---|---|
| 2542489 | 9/1984 | France ................................. 206/387 |
| 336290 | 10/1930 | United Kingdom ................. 312/10 |

Primary Examiner—Victor N. Sakran

[57] ABSTRACT

A device that will allow storage of remote control devices, for T.V.'s, cable boxes, VCR's and audio equipment, pencils, pens, pads and T.V. Guide. The device is of a rectangular design, composed of four walls and a bottom. The insides is comprised of several width-wide compartments that will allow remote controls to be stored in an upright position. A section at either end is equipped with holes and allows for storage of pens and pencils, the outer wall is equipped to hold T.V. Guides. Another version of the device is equipped with a base that will allow rotation, and another has wheels.

1 Claim, 6 Drawing Figures ately 4,708,408

HOME ENTERTAINMENT ACCESSORY ORGANIZER

SUMMARY OF THE INVENTION

The present invention allows safe and easy storing of remote controls for video or audio equipment, pens and or markers used to write down information concerning shows to be watched or taped, and storage for T.V. or Cable Guides.

The storage unit (Home Entertainment Accessory Organizer) can be made of wood, metal or plastic; plastic I am sure would be the least expensive of the materials with which to produce the device. Remote Controls are stored in an upright standing position, one version of the device is stationary, another has a rotating base, another has four swivel type wheels, also another version has a hinged top or a covering.

In simple terms on version of the device is a unit that has a rectangular shape, the inside of the unit has sections which are simply compartments that are walled off areas that are the width of the main section of the unit and about 2 to 3 inches in thickness (from the front of one of the compartment walls to the back of the compartment wall).

The outer wall of either side of the unit had a section that is about one and one-half (1½) inches wide, and runs the length of the unit, this section holds the T.V. Guide. At either end of the unit the last section is equipped with round holes that will hold the pens and markers. The width of the compartments (from front to back) will sometimes vary because not all remote controls are the same size in thickness.

The rotating base is attached to the rest of the unit by means of screws, adhesive, or as part of the unit itself. The working of the rotating base are a cover, several metal ball bearings, a plastic ring with openings that house the ball bearings, and a bottom piece that the plastic ring and ball bearings set in; the bottom piece is held in place by small catches that extend horizontally from the bottom of the cover.

The length of the entire unit is about eight (8) inches long, a standard T.V. or Cable Guide is about seven and three-quarters (7¾) inches long, so the section that holds the T.V. or Cable Guide should be able to do so without cramping it up. Most remote controls are anywhere from two (2) to three (3) inches wide so the width of the unit is about four and one-half (4½) to five (5) inches, wide, including the T.V. Guide section. In some cases the unit is wider to accompany wider remote controls. The height of the unit is about three (3) inches, with a length of about eight (8) inches this unit can hold up to five (5) or six (6) normal size remotes. When being produced the sizes of the overall unit and the size and number of the storage compartments will vary according to the needs of the consumer and their different size remote controls.

As I stated before the device can be made with the rotating base, but the device can also be equipped with four wheels that are attached to swivel-type housing that are attached to the storage unit by means of screws, adhesive or as part of the actual unit.

The top or covering for some versions of the device has hinges which are attached to the rest of the device by means of screws, adhesive or as part of the actual device.

BRIEF DESCRIPTION OF THE DRAWING

Other objects and advantages of the invention will become more apparent from the specification taken in conjunction with the accompanying drawings in which.

DETAILED DESCRIPTION OF THE DRAWING

Figure 1:
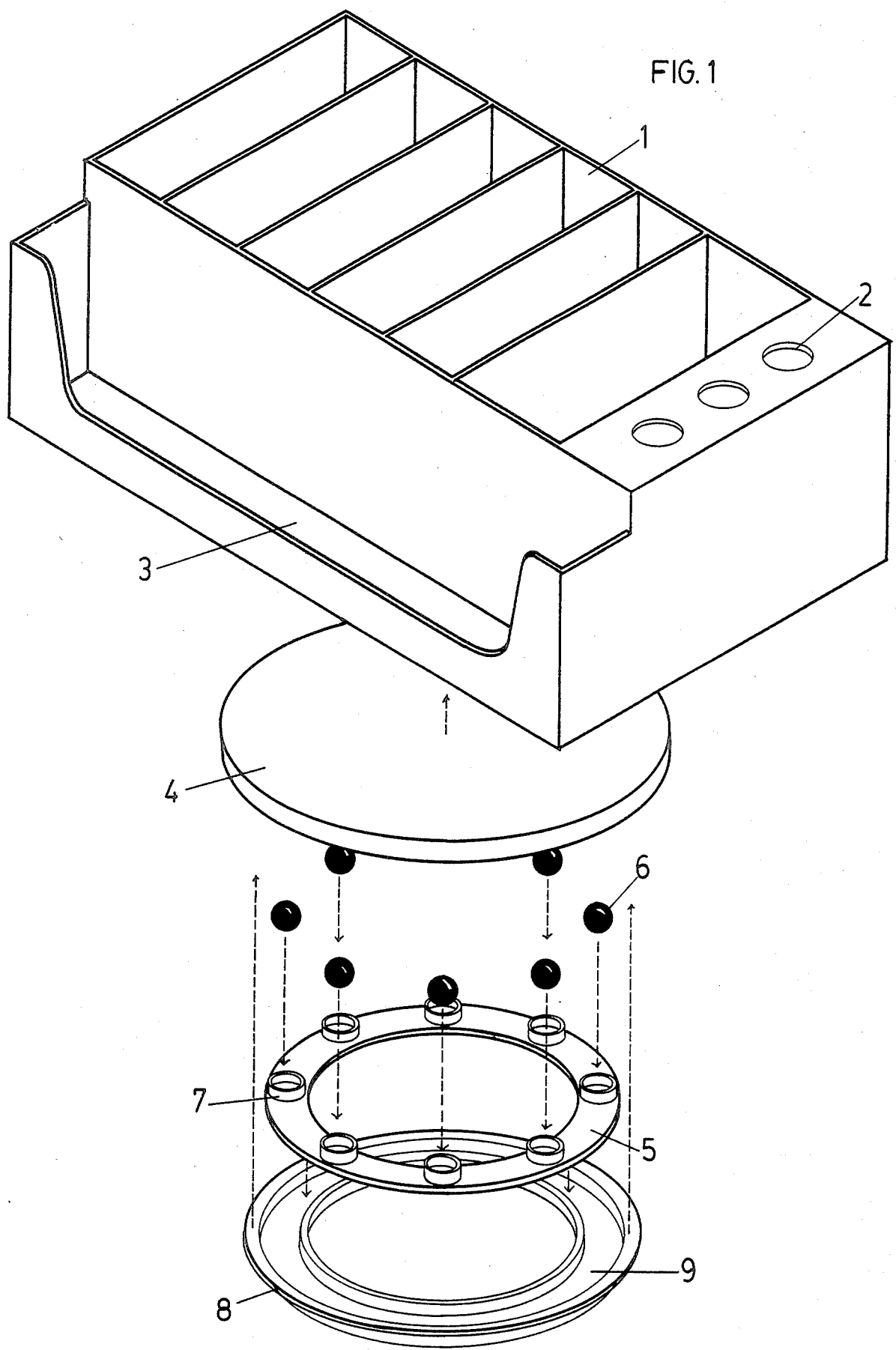
FIG. 1 is a plan view of the Home Entertainment Accessory Organizer, with an exploded view of the rotating base.
Figure 2:
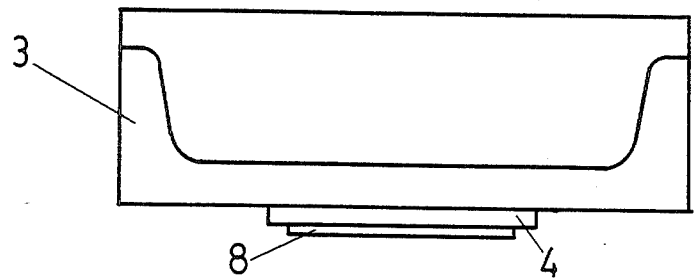
FIG. 2 is a side view of the same object shown in FIG. 1.

Referring to the drawing shown in FIG. 1, numeral 1 designates one of the sections that will hold a remote control, 2 represents one of the holes that will hold pens and markers, 3 represents the side section that will hold the T.V. Guides, 4 is the cover or top of the rotating base, 5 is the plastic ring that holds the ball bearings which 6 represents, 7 is the section of the ring that holds the bearings firmly in place. The arrows indicate where the bearings go, but in truth the bearings fit into the ring from underneath and are held in place by a small lip on the top of each section in the ring, 8 is the bottom plate, which holds the ring and bearings in place, 9 is lower inside section of the bottom plate, on which the ball bearings sit and rotate. The botom plate is attached to the rest of the unit by means of several small lips or catches (not shown in the drawings) that extend from the side of 4 the cover and hold the bottom plate firmly in place by its outer edge (lip) in FIG. 2, numeral 3 shows the side section that is designed to hold T.V. and Cable Guides, 4 is the rotating base and 8 is the bottom plate, held in place by the small catches that extend horizontally from 4 the cover.

Figure 3:
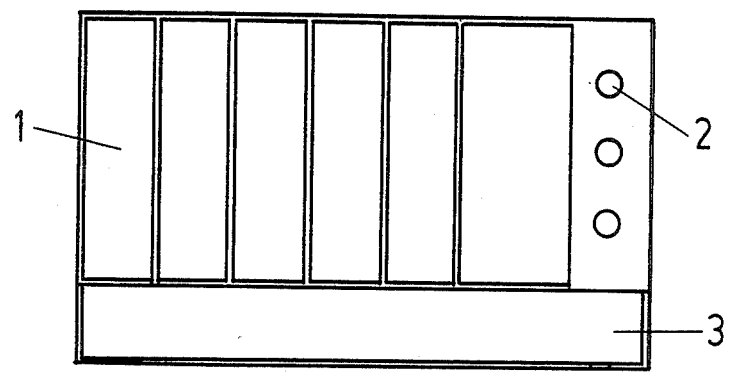
FIG. 3 is a view looking straight down on the same object in FIG. 1.

In FIG. 3 numeral 1 designates the storage section for the remotes, 2 is the holes and the means of placing them. The holes are meant to store pens and markers, 3 is the T.V. Guide storage section.

Figure 4:
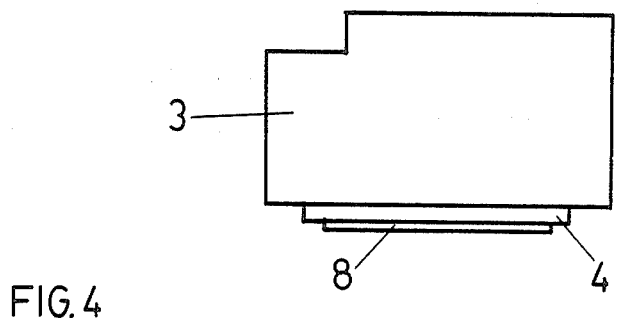
FIG. 4 is a front view of the same object in FIG. 1.

In FIG. 4 numeral 3 designates the side section for T.V. Guides, 4 is the cover and 8 is the bottom plate.

Figure 5:
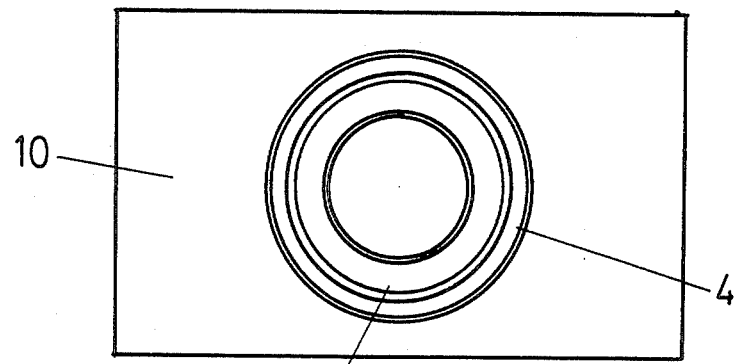
FIG. 5 shows a view of the bottom of the same object in FIG. 1.

In FIG. 5 numeral 4 shows the cover of the rotating base, 8 shows the bottom plate, 10 shows the bottom of the whole unit.

Figure 6:
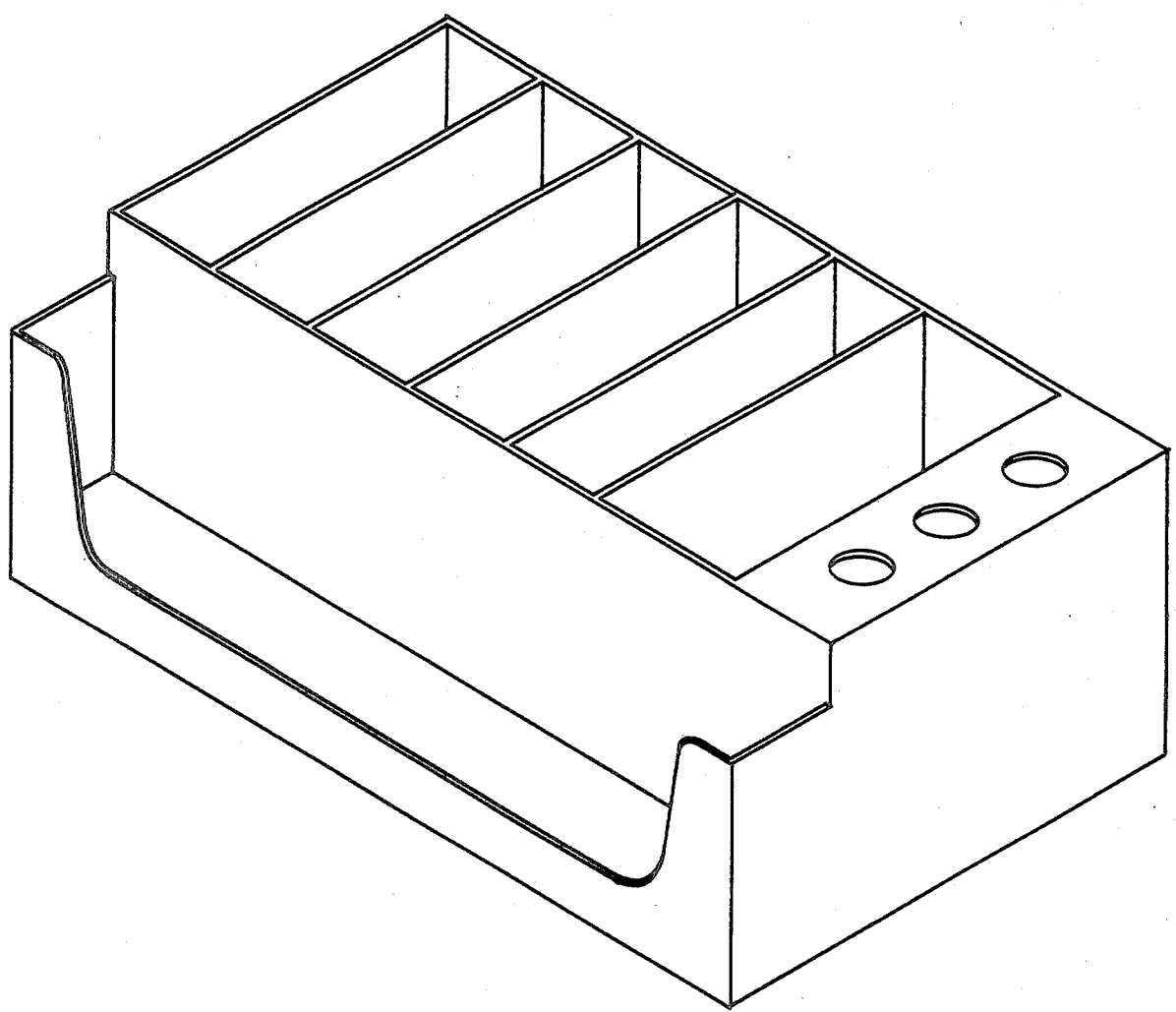
FIG. 6 is a plan view of an Organizer without a rotating base.

In FIG. 6 the same device in FIG. 1 but without a rotating base is shown. This version would be cheaper to produce than one with a base.

The disclosure of the invention described hereinabove represents the preferred embodiments of the invention; however, it is to be understood that certain modifications may have to and therefore will be made as deemed necessary, without departing from the scope of the appended claims.

I claim:

1. A video and audio accessory storage device comprised of; a rectangular shape, a bottom wall, two side walls, two end walls, means at either end to house several circular holes for holding pencils, means on either side wall for housing compartment that holds T. V. Guide, a plurality of spaced, parallel, divider panels disposed between, and spaced from, said end walls and extending parallel thereto, said divider panels each being substantially identical in shape to said end walls, and secured and extending perpendicularly to, said front, back and bottom walls, a rotating base comprising a lower circular plate having a downwardly directed circular groove, forming a race for spherical ball bearings, said ball bearings being housed in a ring, of slightly less radius than that of said racing groove, said ring being comprised of tubular openings of slightly larger radius than that of said ball bearings and spaced apart in a manner which allows use of less ball bearing to achieve the same desired result, a circular cover plate on which upper section of said bearings race along, the periphery of said upper plate extending downward to cover outer peripheral edge of said lower circular plate, so as to hold said bearing in said race without impeding the rotation of said base, fixing means to attach said top plate to said lower plate in such a fashion as to hold said lower plate in place but not impede rotation.

* * * * *